(12) United States Patent
Amitai

(10) Patent No.: US 10,048,499 B2
(45) Date of Patent: Aug. 14, 2018

(54) POLARIZING OPTICAL SYSTEM

(71) Applicant: LUMUS LTD., Rehovot (IL)

(72) Inventor: Yaakov Amitai, Rehovot (IL)

(73) Assignee: LUMUS LTD., Ness Ziona (IL)

( * ) Notice: Subject to any disclaimer, the term of this patent is extended or adjusted under 35 U.S.C. 154(b) by 0 days.

(21) Appl. No.: 15/289,774

(22) Filed: Oct. 10, 2016

(65) Prior Publication Data

US 2017/0052377 A1  Feb. 23, 2017

Related U.S. Application Data

(62) Division of application No. 12/092,818, filed as application No. PCT/IL2006/001278 on Nov. 6, 2006, now Pat. No. 9,551,880.

(30) Foreign Application Priority Data

Nov. 8, 2005 (IL) .......................................... 171820

(51) Int. Cl.

| | | |
|---|---|---|
| *G02B 5/30* | (2006.01) | |
| *G02B 27/01* | (2006.01) | |
| *G02B 27/28* | (2006.01) | |
| *G02B 6/34* | (2006.01) | |
| *F21V 8/00* | (2006.01) | |

(52) U.S. Cl.
CPC ....... *G02B 27/0172* (2013.01); *G02B 5/3058* (2013.01); *G02B 5/3083* (2013.01); *G02B 6/003* (2013.01); *G02B 6/0056* (2013.01); *G02B 6/34* (2013.01); *G02B 27/283* (2013.01); *G02B 27/285* (2013.01); *G02B 27/286* (2013.01); *G02B 6/0035* (2013.01); *G02B 2027/0125* (2013.01); *G02B 2027/0178* (2013.01)

(58) Field of Classification Search
CPC .. G02B 5/3058; G02B 5/3083; G02B 27/283; G02B 27/286; G02B 27/0172
USPC ............ 359/485.01, 485.05, 485.07, 489.07, 359/489.08, 489.09, 489.15
See application file for complete search history.

(56) References Cited

U.S. PATENT DOCUMENTS

| | | |
|---|---|---|
| 2,748,659 A | 6/1956 | Hubert et al. |
| 3,667,621 A | 7/1972 | Smith |
| 4,331,387 A | 5/1982 | Wentz |
| 5,033,828 A | 7/1991 | Haruta |
| 5,076,664 A | 12/1991 | Migozzi |
| 5,619,601 A | 4/1997 | Akashi et al. |
| 5,650,873 A | 7/1997 | Gal et al. |
| 5,680,209 A | 10/1997 | Machler |
| 5,751,480 A | 5/1998 | Kitagishi |
| 5,764,412 A | 6/1998 | Suzuki et al. |
| 5,896,232 A | 4/1999 | Budd et al. |
| 6,362,861 B1 | 3/2002 | Hertz et al. |

(Continued)

FOREIGN PATENT DOCUMENTS

| | | |
|---|---|---|
| EP | 0 566 004 | 10/1993 |
| EP | 1 562 066 | 8/2005 |

(Continued)

*Primary Examiner* — Ricky D Shafer
(74) *Attorney, Agent, or Firm* — Mark M. Friedman

(57) ABSTRACT

There is provided an optical system, including a light-transmitting substrate having at least two major surfaces parallel to each other edges, and an optical device for coupling light into the substrate by total internal reflection. The device includes a polarization sensitive reflecting surface.

38 Claims, 12 Drawing Sheets

(56) References Cited

U.S. PATENT DOCUMENTS

| | | | |
|---|---|---|---|
| 6,404,550 | B1 | 6/2002 | Yajima |
| 6,690,513 | B2 | 2/2004 | Hulse et al. |
| 7,448,170 | B2 | 8/2008 | Mukawa et al. |
| 7,457,040 | B2 | 11/2008 | Amitai |
| 7,643,214 | B2 | 1/2010 | Amitai |
| 7,724,443 | B2 | 5/2010 | Amitai |
| 7,995,275 | B2 | 8/2011 | Maeda et al. |
| 8,000,020 | B2 | 8/2011 | Amitai |
| 8,035,872 | B2 | 10/2011 | Ouchi |
| 8,098,439 | B2 * | 1/2012 | Amitai .................. G02B 13/22 345/7 |
| 8,432,614 | B2 | 4/2013 | Amitai |
| 8,643,948 | B2 | 2/2014 | Amitai |
| 9,025,253 | B2 * | 5/2015 | Hadad ..................... G02B 6/00 353/81 |
| 9,551,880 | B2 * | 1/2017 | Amitai ..................... G02B 6/00 |
| 2003/0090439 | A1 | 5/2003 | Spitzer et al. |

FOREIGN PATENT DOCUMENTS

| | | |
|---|---|---|
| JP | 2002-539498 | 9/2000 |
| JP | 2003-536102 | 12/2001 |
| JP | 2004-527801 | 12/2002 |
| JP | 2005-084522 | 3/2005 |
| WO | WO 03/081320 | 10/2003 |
| WO | WO 2005/093493 | 3/2005 |
| WO | WO 2006/085308 | 8/2006 |

* cited by examiner

POLARIZING OPTICAL SYSTEM

CROSS REFERENCE TO RELATED APPLICATIONS

This application is a divisional of application Ser. No. 12/092,818 filed May 6, 2008 for POLARIZING OPTICAL SYSTEM, now U.S. Pat. No. 9,551,880, granted Jan. 24, 2017.

1. FIELD OF THE INVENTION

The present invention relates to substrate-guided optical devices, and more particularly, to devices which include a plurality of reflecting surfaces carried by a common light-transmissive substrate, also referred to as a light-guide.

The invention can be implemented to advantage in a large number of imaging applications, such as, for example, head-mounted and head-up displays, cellular phones, compact displays, 3-D displays, compact beam expanders as well as non-imaging applications such as flat-panel indicators, compact illuminators and scanners.

DESCRIPTION OF RELATED ART

One of the important applications for compact optical elements is in head-mounted displays, wherein an optical module serves both as an imaging lens and a combiner, in which a two-dimensional display is imaged to infinity and reflected into the eye of an observer. The display can be obtained directly from either a spatial light modulator (SLM), such as a cathode ray tube (CRT), a liquid crystal display (LCD), an organic light emitting diode array (OLED), or a scanning source and similar devices, or indirectly, by means of a relay lens or an optical fiber bundle. The display comprises an array of elements (pixels) imaged to infinity by a collimating lens and transmitted into the eye of the viewer by means of a reflecting or partially reflecting surface acting as a combiner for non-see-through and see-through applications, respectively. Typically, a conventional, free-space optical module is used for these purposes. As the desired field-of-view (FOV) of the system increases, such a conventional optical module becomes larger, heavier, bulkier and therefore, even for a moderate performance device, impractical. This is a major drawback for all kinds of displays, but especially in head-mounted applications, where the system must necessarily be as light and as compact, as possible.

The strive for compactness has led to several different complex optical solutions, all of which, on the one hand, are still not sufficiently compact for most practical applications, and, on the other hand, suffer major drawbacks in terms of manufacturability. Furthermore, the eye-motion-box (EMB) of the optical viewing angles resulting from these designs is usually very small—typically less than 8 mm. Hence, the performance of the optical system is very sensitive, even to small movements of the optical system relative to the eye of the viewer, and does not allow sufficient pupil motion for convenient reading of text from such displays.

SUMMARY OF THE INVENTION

The present invention facilitates the design and fabrication of very compact light-guide optical elements (LOE) for, amongst other applications, head-mounted displays. The invention allows relatively wide POVs together with relatively large EMB values. The resulting optical system offers a large, high-quality image, which also accommodates large movements of the eye. The optical system offered by the present invention is particularly advantageous because it is substantially more compact than state-of-the-art implementations and yet it can be readily incorporated even into optical systems having specialized configurations.

The invention also enables the construction of improved head-up displays (HUDs). Since the inception of such displays more than three decades ago, there has been significant progress in the field. Indeed, HUDs have become popular and they now play an important role, not only in most modern combat aircraft, but also in civilian aircraft, in which HUD systems have become a key component for low visibility landing operation. Furthermore, there have recently been numerous proposals and designs for HUDs in automotive applications where they can potentially assist the driver in driving and navigation tasks. Nevertheless, state-of-the-art I-IUDs suffer several significant drawbacks. All HUDs of the current designs require a display source that must be offset a significant distance from the combiner to ensure that the source illuminates the entire combiner surface. As a result, the combiner-projector HUD system is necessarily bulky and large, and requires a considerable installation space, which makes it inconvenient for installation and at times even unsafe to use. The large optical aperture of conventional I-IUDs also poses a significant optical design challenge, rendering the HUDs with either compromised performance, or leading to high cost wherever high-performance is required. The chromatic dispersion of high-quality holographic HUDs is of particular concern.

An important application of the present invention relates to its implementation in a compact HUD, which alleviates the aforementioned drawbacks. In the HUD design of the current invention, the combiner is illuminated with a compact display source that can be attached to the substrate. Hence, the overall system is very compact and can readily be installed in a variety of configurations for a wide range of applications. In addition, the chromatic dispersion of the display is negligible and, as such, can operate with wide spectral sources, including a conventional white-light source. In addition, the present invention expands the image so that the active area of the combiner can be much larger than the area that is actually illuminated by the light source.

A further application of the present invention is to provide a compact display with a wide FOV for mobile, hand-held application such as cellular phones. In today's wireless internet-access market, sufficient bandwidth is available for full video transmission. The limiting factor remains the quality of the display within the device of the end-user. The mobility requirement restricts the physical size of the displays, and the result is a direct-display with a poor image viewing quality. The present invention enables a physically very compact display with a very large virtual image. This is a key feature in mobile communications, and especially for mobile internet access, solving one of the main limitations for its practical implementation. The present invention thereby enables the viewing of the digital content of a full format internet page within a small, hand-held device, such as a cellular phone.

The broad object of the present invention, therefore, is to alleviate the drawbacks of state-of-the-art compact optical display devices and to provide other optical components and systems having improved performance, according to specific requirements.

The invention therefore provides an optical system, comprising a light-transmitting substrate having at least two major surfaces parallel to each other and edges, and an optical device for coupling light into said substrate by total internal reflection, characterized in that said device for coupling light includes a polarization sensitive reflecting surface.

BRIEF DESCRIPTION OF THE DRAWINGS

Many of the attendant advantages of this invention will be readily appreciated as the same becomes better understood by reference to the following detailed description considered in conjunction with the accompanying drawings in which like reference numeral designate like parts throughout the figures thereof and wherein.

DETAILED DESCRIPTION OF THE PREFERRED EMBODIMENTS

Figure 1:
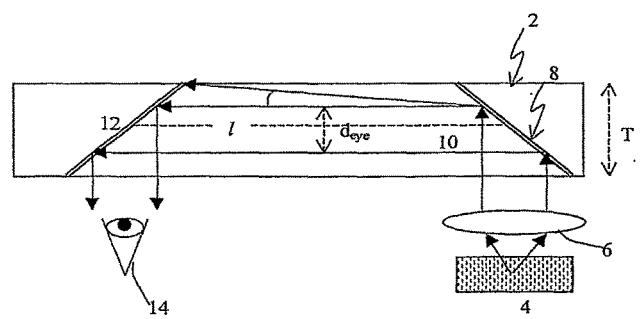
FIG. 1 is a side view of a generic form of a prior art folding optical device.

FIG. 1 illustrates a conventional folding optics arrangement, wherein the substrate 2 is illuminated by a display source 4. The display is collimated by a collimating lens 6. The light from the display source 4 is coupled into substrate 2 by a first reflecting surface 8 in such a way that the main ray 10 is parallel to the substrate plane. A second reflecting surface 12 couples the light out of the substrate and into the eye of a viewer 14. Despite the compactness of this configuration, it suffers significant drawbacks; in particular, only a very limited POV can be affected. As shown in FIG. 1, the maximum allowed off-axis angle inside the substrate is:

$$\alpha_{max} = \arctan\left(\frac{T - d_{eye}}{2l}\right), \quad (1)$$

wherein T is the substrate thickness;
$d_{eye}$ is the desired exit-pupil diameter, and
l is the distance between reflecting surfaces 8 and 12.
With angles higher than $\alpha_{max}$ the rays are reflected from the substrate surface before arriving at the reflecting surface 12. Hence, the reflecting surface 12 will be illuminated at an undesired direction and ghost images appear.

Therefore, the maximum achievable FOV with this configuration is:

$$FOV_{max} \approx 2\nu\alpha_{max}, \quad (2)$$

wherein v is the refractive index of the substrate.
Typically the refractive index values lie in the range of 1.5-1.6.

Commonly, the diameter of the eye pupil is 2 to 6 mm. To accommodate movement or misalignment of the display, a larger exit-pupil diameter is necessary. Taking the minimum desirable value at approximately 8 to 10 mm, the distance between the optical axis of the eye and the side of the head, l, is, typically, between 40 and 80 mm. Consequently, even for a small POV of 8°, the desired substrate thickness would be of the order of 12 mm.

Methods have been proposed to overcome the above problem, including utilizing a magnifying telescope inside the substrate and non-parallel coupling directions. Even with these solutions, however, and even if only one reflecting surface is considered, the system's thickness remains limited by a similar value. The FOV is limited by the diameter of the projection of the reflective surface 12 on the substrate plane. Mathematically, the maximum achievable FOV, due to this limitation, is expressed as:

$$FOV_{max} \approx \frac{T \tan\alpha_{sur} - d_{eye}}{R_{eye}}, \quad (3)$$

wherein $\alpha_{sur}$ is the angle between the reflecting surface and the normal to the substrate plane, and $R_{eye}$ is the distance between the eye of the viewer and the substrate (typically, about 30-40 mm).

Practically tan $\alpha_{sur}$ cannot be much larger than 1; hence, for the same parameters described above for a FOV of 8°, the required substrate thickness here is in the order of 7 mm, which is an improvement on the previous limit. Nevertheless, as the desired FOV is increased, the substrate thickness increases rapidly. For instance, for desired FOVs of 15° and 30° the substrate limiting thickness is 18 mm or 25 mm, respectively.

Figure 2:
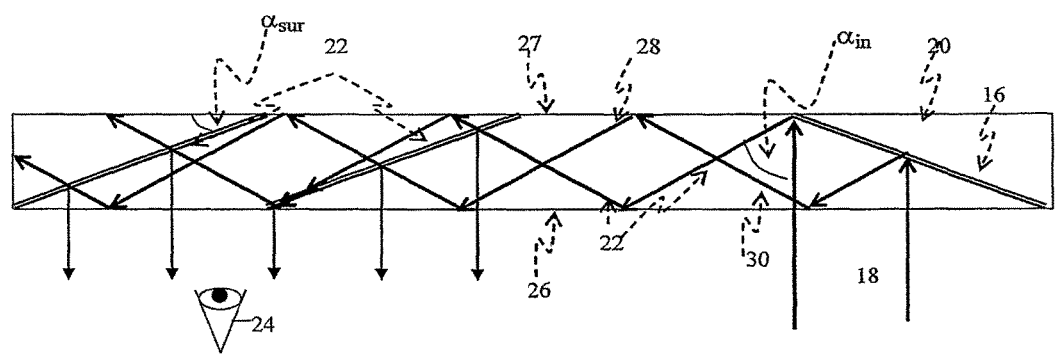
FIG. 2 is a side view of an exemplary light-guide optical element.

To alleviate the above limitations, it is possible to utilize an array of at least one parallel selectively reflecting surface, fabricated within a LOE comprising a flat light-transmitting substrate having at least two major surfaces and edges. FIG. 2 illustrates a sectional view of an LOE. The first reflecting surface 16 is illuminated by a collimated light waves 18 emanating from a display source (not shown) located behind the device. The reflecting surface 16 reflects the incident light from the source such that the light is trapped inside a planar substrate 20 by total internal reflection. After several reflections from the surfaces of the substrate, the trapped waves reach an array of selectively reflecting surfaces 22, which couple the light out of the substrate into the eye of a viewer 24. Assuming that the central wave of the source is coupled out of the substrate 20 in a direction normal to the substrate surface 26 and the off-axis angle of the coupled wave inside the substrate 20 is $\alpha_{in}$, then the angle $\alpha_{sur2}$ between the reflecting surfaces and the substrate plane is:

$$\alpha_{sur2} = \frac{\alpha_{in}}{2}, \quad (4)$$

As can be seen in FIG. 2, the trapped rays arrive at the reflecting surfaces from two distinct directions 28, 30. In this particular embodiment, the trapped rays arrive at the reflecting surface from one of these directions 28 after an even number of reflections from the substrate surfaces 26, wherein the incident angle $\beta_{ref}$ between the trapped ray and the normal to the reflecting surface is:

$$\beta_{ref} = \alpha_{in} - \alpha_{sur2} = \frac{\alpha_{in}}{2}, \quad (5)$$

The trapped rays arrive at the reflecting surface from the second direction 30 after an odd number of reflections from the lower substrate surfaces 26, where the off-axis angle is $\alpha'_{in} = 180° - \alpha_{in}$ and the incident angle between the trapped ray and the normal to the reflecting surface is:

$$\beta'_{ref} = \alpha'_{in} - \alpha_{sur2} = 180° - \alpha_{in} - \alpha_{sur2} = 180° - \frac{3\alpha_{in}}{2}, \quad (6)$$

In order to prevent undesired reflections and ghost images, it is important that the reflectance be negligible for one of these two directions. The desired discrimination between the two incident directions can be achieved if one angle is significantly smaller than the other one. It is possible to design a coating with very low reflectance at high incident angles and a high reflectance for low incident angles. This property can be exploited to prevent undesired reflections and ghost images by eliminating the reflectance in one of the two directions. For example choosing $\beta'_{ref} = 25°$ from Equations (5) and (6) it can be calculated that:

$$\beta'_{ref} = 105°; \alpha_{in} = 50°; \alpha'_{in} = 130°; \alpha_{sur2} = 25°. \quad (7)$$

Figures 3A, 3B:
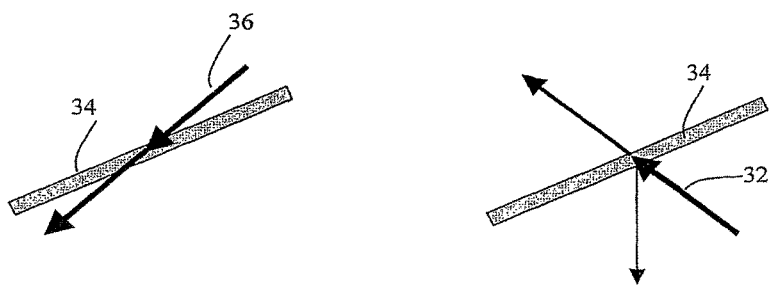
FIGS. 3A and 3B illustrate the desired reflectance and transmittance characteristics of selectively reflecting surfaces for two ranges of incident angles.

Now, if a reflecting surface is determined for which $\beta'_{ref}$ not reflected but $\beta_{ref}$ is, the desired condition is achieved. FIGS. 3A and 3B illustrate the desired reflectance behavior of selectively reflecting surfaces. While the ray 32 (FIG. 3A), having an off-axis angle of $\beta_{ref} \sim 25°$, is partially reflected and coupled out of the substrate 34, the ray 36 (FIG. 3B), which arrives at an off-axis angle of $\beta'_{ref} \sim 75°$ to the reflecting surface (which is equivalent to $\beta_{ref} \sim 105°$), is transmitted through the reflecting surface 34, without any notable reflection.

Hence, as long as it can be ensured that $\beta'_{ref}$, where very low reflections are desired, will have negligible reflection, similar to that at $\beta'_{ref} \sim 75°$, over its angular spectrum, while $\beta_{ref}$, will have higher reflections, over its angular spectrum, for a given POV, the reflection of only one substrate mode into the eye of the viewer and a ghost-free image, can be ensured.

Figure 4:
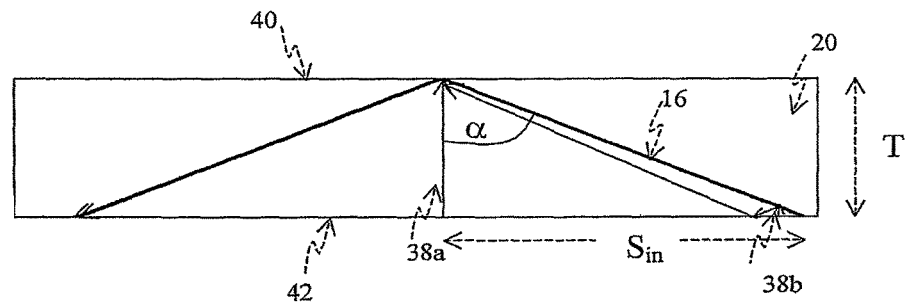
FIG. 4 is a schematic sectional-view of a reflective surface embedded inside a light-guide optical element.

It is important not only to couple the image out of the substrate without any distortion or ghost image, but also to couple the light properly into the substrate. FIG. 4, which illustrates one method for coupling-in, presents a sectional view of the reflective surface 16, embedded inside the substrate 20 and couples light 38a, 38b from a display source (not shown) and traps it inside the substrate 20 by total internal reflection. To avoid an image with gaps or stripes, it is essential that the trapped light will cover the entire area of the LOE major surfaces. To ensure this, the points on the boundary line 41 between the edge of the reflective surface 16 and the upper surface 40 of the substrate 20, should be illuminated for a single wave by two different rays that enter the substrate from two different locations: a ray 38a that illuminates the boundary line 41 directly, and another ray 38b, which is first reflected by the reflecting surface 16 and then by the lower surface 42 of the substrate, before illuminating the boundary line.

The embodiment described above with regard to FIG. 4 is an example of a method for coupling input waves into the substrate. Input waves could, however, also be coupled into the substrate by other optical means, including (but not limited to) folding prisms, fiber optic bundles, diffraction gratings, and other solutions.

Figure 5:
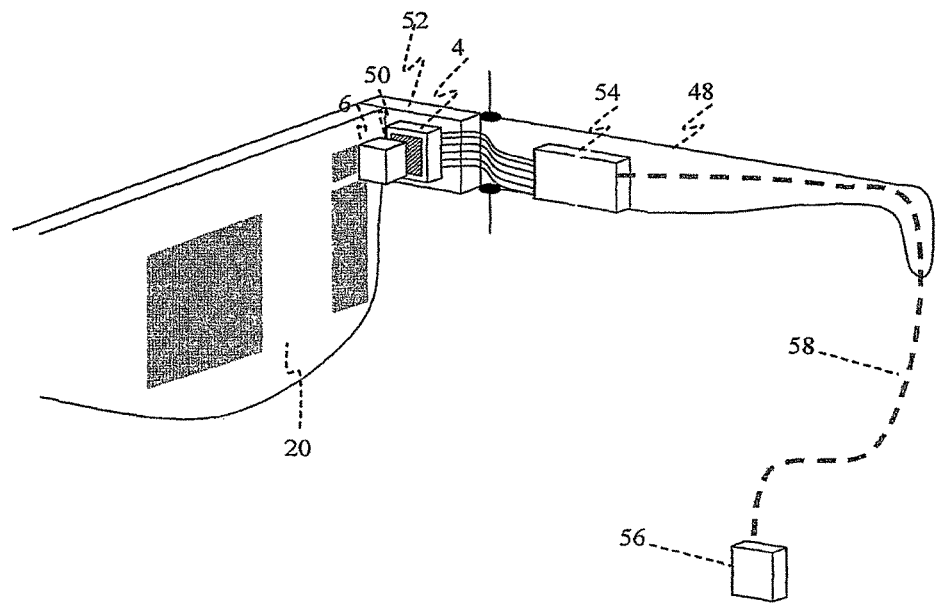
FIG. 5 illustrates an exemplary embodiment of a light-guide optical element embedded in a standard eyeglasses frame.

FIG. 5 illustrates an embodiment that utilizes the coupling-in device described in FIG. 4, in which the LOE 20 is embedded in an eyeglasses frame 48. The display source 4, the collimating lens 6, and the folding lens 50 are assembled inside the arm portions 52 of the eyeglasses frame, next to the edge of the LOE 20. For cases where the display source is an electronic element, such as a small CRT, LCD or OLED, the driving electronics 54 for the display source can be assembled inside the back portion of the arm 48. A power supply and data interface 56 can be connected to arm 48 by a lead 58 or other communication means, including radio or optical transmission. Alternatively, a battery and miniature data link electronics can be integrated into the eyeglasses frame.

Figure 6:
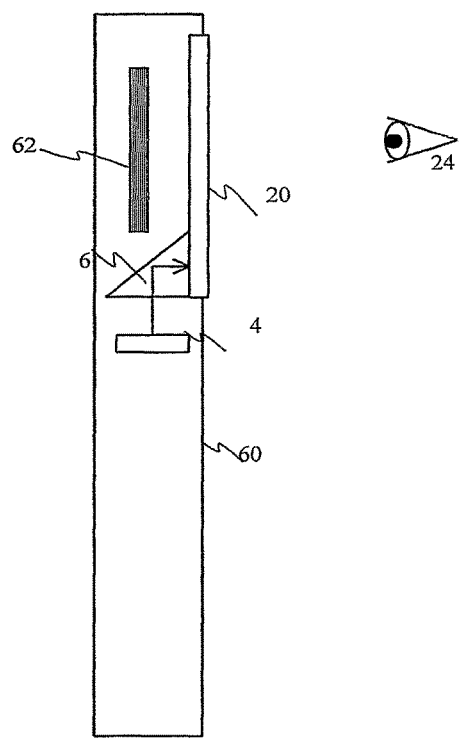
FIG. 6 illustrates an exemplary embodiment of a light-guide optical element embedded in a hand carried display system.

FIG. 6 illustrates another application that utilizes the coupling-in embodiment described in FIG. 4. This application is a hand-held display (HHD), which resolves the previously opposing requirements of achieving small mobile devices, and the desire to view digital content on a full format display, by projecting high quality images directly into the eye of the user. An optical module including the display source 4, the folding and collimating optics 6 and the substrate 20 is integrated into the body of a cellular phone 60, where the substrate 20 replaces the existing protective cover window of the phone. Specifically, the volume of the support components, including source 4 and optics 6 is sufficiently small to fit inside the acceptable volume for modem cellular devices. In order to view the full screen transmitted by the device, the user positions the window in front of his eye 24, observing the image with high FOV, a large EMB and a comfortable eye-relief. It is also possible to view the entire FOV at a larger eye-relief by tilting the device to display different portions of the image. Furthermore, since the optical module can operate in see-through configuration, a dual operation of the device is possible. That is, there is an option to maintain the conventional cellular display 62 intact. In this manner, the standard, low-resolution display can be viewed through the LOE 20 when the display source 4 is shut-off. In a second, virtual-mode, designated for e-mail reading, internet surfing, or video operation, the conventional display 62 is shut-off, while the display source 6 projects the required wide FOV image into the eye of the viewer through the LOE 20. The embodiment described in FIG. 6 is only an example, illustrating that applications other than head-mounted displays can be materialized. Other possible hand-carried arrangements include palm computers, small displays embedded into wrist-watches, a pocket-carried display having the size and weight reminiscent of a credit card, and many more.

As illustrated in FIGS. 5 and 6, there is one major difference between the two applications. In the eyeglasses configuration illustrated in FIG. 5, the input waves and the image waves are located on the same side of the substrate, while in the hand-held configuration illustrated in FIG. 6, the input and the image waves are located on opposite sides of the substrate. This difference not only affects the shape and size of the overall opto-mechanical module, but also determines the internal structure of the LOE. As illustrated in FIG. 2, wherein the input waves and the image waves are located on the same side of the substrate, the coupling-in element 16 is embedded inside the LOE 20 in a different orientation to that of the couple-out elements 22. As illustrated in FIGS. 7 A to 7D, however, wherein the input and the image waves are located on opposite sides of the substrate, the coupling-in element 16 is embedded inside the LOE 20 in a similar orientation to that of the couple-out elements 22. In fact, the reflecting surface 16 is usually parallel to the partially reflecting surfaces 22. This difference is not only cosmetic, but also can significantly influence the fabrication procedure of the LOE.

Figure 7A:
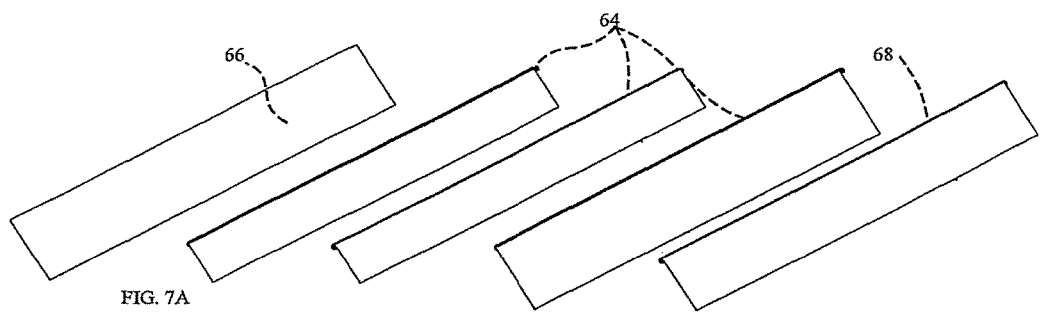
FIGS. 7A to 7D are diagrams illustrating a method for fabricating an array of partially reflecting surfaces along with a coupling-in reflecting surface.
Figure 7B:
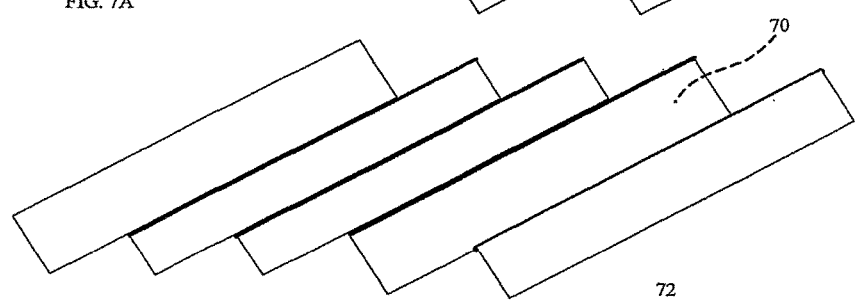
Figure 7C:
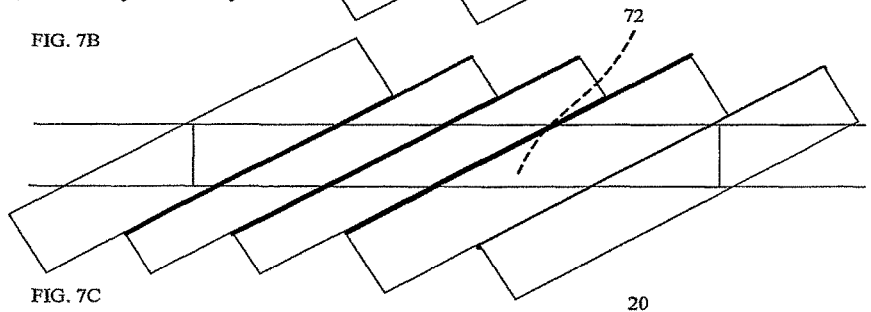
Figure 7D:

It is important that the fabrication process of the LOE will be as simple and inexpensive as possible. Although this is true for all the potential applications, it is especially critical for applications wherein the price of the final product must be appropriate for the consumer market. FIGS. 7 A to 7D illustrate a method of fabricating an LOE with the internal structure illustrated in FIG. 8. First, as seen in FIG. 7 A, a group of parallel plates 64 and an associated group of partially reflecting surfaces (coated onto these plates) are manufactured, to the required dimensions. The plates 64 can be fabricated from silicate-based materials such as BK-7 with the conventional techniques of grinding and polishing, or alternatively, they can be made from polymer or sol-gel materials using injection-molding or casting techniques. Next, a blank plate 66, the coated plates 64, and a plate having a reflecting surface 68 are cemented together to create a stacked form 70, as illustrated in FIG. 7B. A segment 72 (see FIG. 7C) is then sliced off the stacked form by cutting, grinding and polishing, to create the desired LOE 20, shown in FIG. 7D. The procedure illustrated in FIGS. 7 A to 7D of coating, cementing, slicing, grinding and polishing can be totally automated to devise a straightforward and inexpensive procedure, which would be appropriate for mass production processes.

Figure 9A:
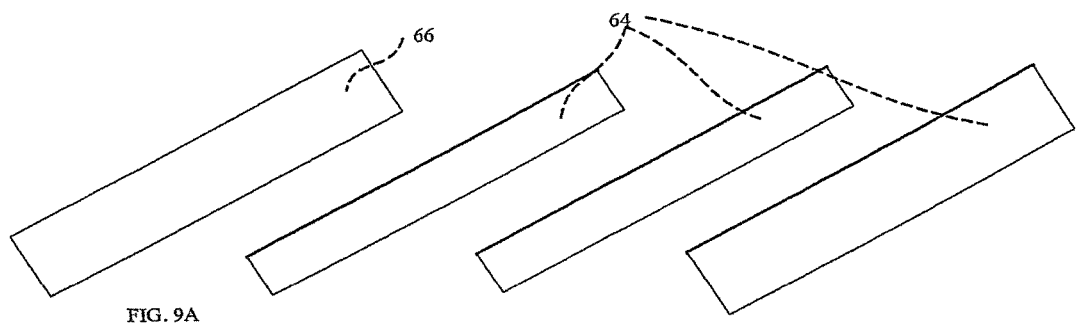
FIG. 9A to FIGS. 9D, 10A to 10D, 11A and 11B are diagrams illustrating other methods for fabricating an array of partially reflecting surfaces along with a coupling-in reflecting surface.
Figure 9B:
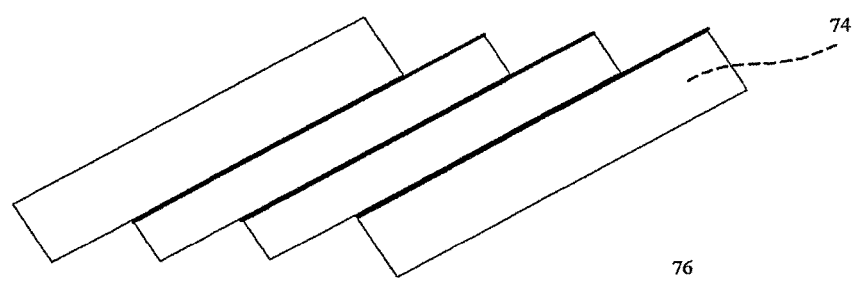
Figure 9C:
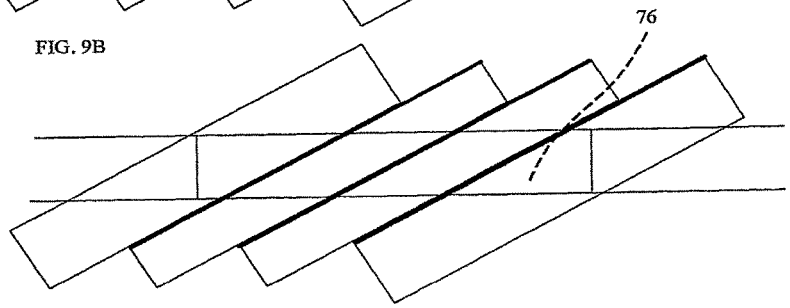
Figure 9D:

For LOEs having the internal structures of FIG. 2, the fabrication procedure is much more complicated. FIGS. 9A to 9D illustrate a method of fabricating an LOE having the required internal structure. The group of parallel coated plates 64, FIG. 9A, are manufactured as before, however, since the reflecting surface 16 (FIG. 2) is no longer parallel to surfaces 22, the plate with the reflecting surface 68 cannot be cemented to the stack 70 as before. Therefore, the coupling-out portion of the LOE only can be fabricated in the above manner, that is, only the blank plate 66 and the coated plates 64 are cemented together to create the stacked form 74, shown in FIG. 9B. A segment 76 (FIG. 9C) is then sliced off the stacked form by cutting, grinding and polishing, to create the coupling-out portion 78 (FIG. 9D) of the desired LOE 20.

Figure 10A:
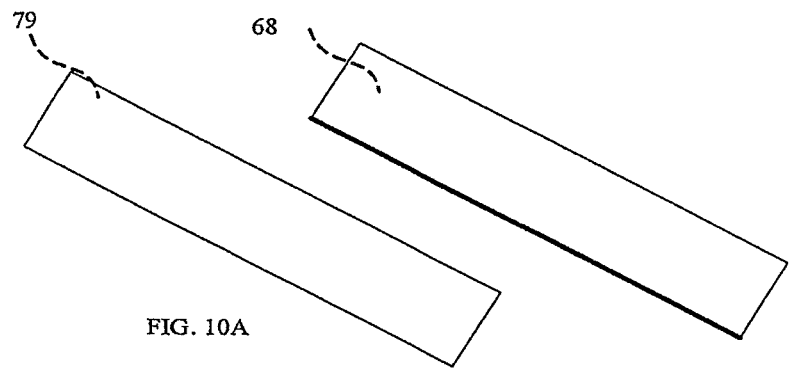
Figure 10B:
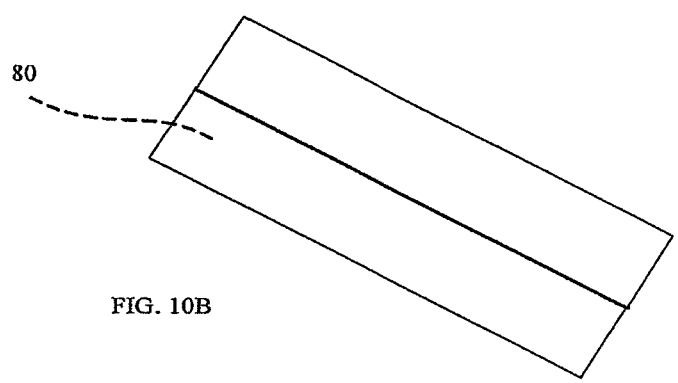
Figure 10C:
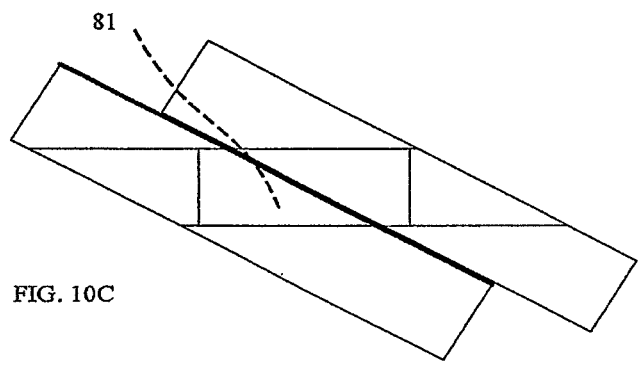
Figure 10D:
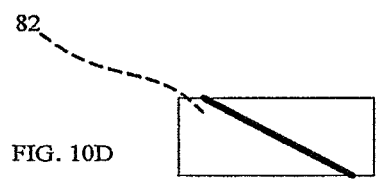

FIGS. 10A to 10D illustrate how the coupling-in portion 82 of the LOE is prepared separately, in the same manner, as follows: another blank plate 79 (FIG. 10A) and the plate 68 having the required reflecting surface are cemented together to create a stacked form 80 (FIG. 10B). A segment 81, shown in FIG. 10C, is then sliced off the stacked form by cutting, grinding and polishing, to devise the desired coupling-in portion 82 (FIG. 10D).

Figure 11A:
Figure 11B:
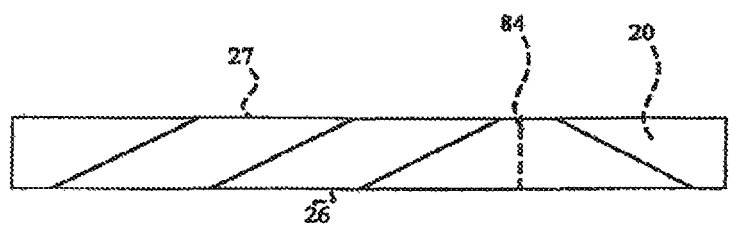

FIGS. 11A and 11B illustrate how the final fabrication step of the LOE is completed. The coupling-out portion 78 and the coupling-in portion 82 are cemented together along the common surface 84 to create the final LOE 20. Since, for most applications, the quality of the optical surfaces is critical, the final step of polishing the outer surfaces 26 and 27, shown advantageously to be added to the process.

There are some disadvantages to the fabrication process illustrated in FIGS. 9A to 9D, 10A to 10D, 11A and 11B as compared to the process illustrated in FIGS. 7A to 7D. Not only that the number of the fabricating steps is increased from one to three, but most significantly, the last step is particularly complicated and requires special manufacturing attention. The common surface 84 should be fabricated, with high accuracy, normal to the major surfaces 26 and 27 in both portions 78 and 82. Moreover, the cemented surface 84 might be broken during the final grinding and polishing step, especially for fabrication of very thin substrates.

Figure 8:
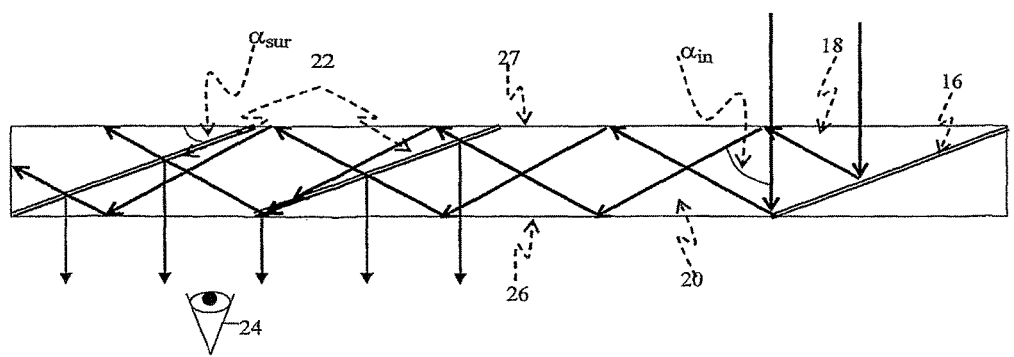
FIG. 8 is a side view of another exemplary light-guide optical element.
Figure 12:
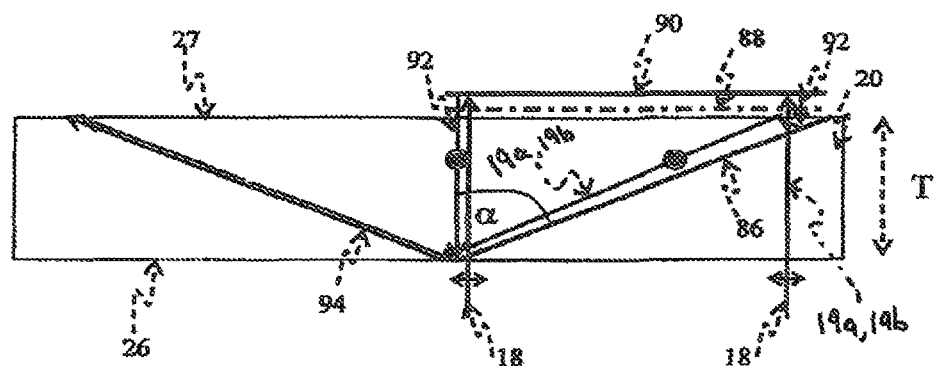
FIG. 12 is a diagram illustrating a system for coupling-in polarized input waves into a light-guide optical element in accordance with the present invention.

Hence, an LOE having an internal structure as illustrated in FIG. 8, is preferred over that of FIG. 2. It is therefore important to find a method to fabricate an LOE having the former configuration even for optical systems wherein the input waves and the image waves are located on the same side of the substrate. A method which achieves these two seemingly contradictory requirements and which exploits the fact that in most micro-display sources, such as LCD or LCOS, the light is linearly polarized, as illustrated in FIG. 12. The main difference between the embodiment illustrated here and the embodiment illustrated in FIGS. 2 and 8 is that instead of utilizing a uniformly reflecting mirror 16 as the coupling-in element, a polarizing beamsplitter 86 is embedded inside the LOE. That is, surface 86 transmits p-polarized and reflects s-polarized light. As will be described, p-polarized and s-polarized coupled-in light waves correspond to first and second parts (19a, 19b) of coupled-in light waves. In some embodiments, p-polarized coupled-in light waves correspond to the first part 19a of coupled-in light waves and s-polarized coupled-in light waves correspond to the second part 19b of coupled-in light waves. In other embodiments, s-polarized coupled-in light waves correspond to the first part 19a of coupled-in light waves and p-polarized coupled-in light waves correspond to the second part 19b of coupled-in light waves. As illustrated in FIG. 12, the input beam 18 from the collimated display source (not shown) is p-polarized, and therefore is transmitted through surfaces 86. After exiting the LOE through the upper surface 27, the light beam impinges on a quarter wave retardation member, e.g., a retardation plate 88 which converts the incoming beam into circular polarized light. The transmitted beam is then reflected back through the quarter-wave retardation plate 88 by a flat reflecting mirror 90. The reflected beam 92, now s-polarized, enters the LOE through the upper surface 27 and is reflected by the polarizing beamsplitter 86. The reflected rays 94 are trapped inside the LOE by total internal reflection. Apparently, the retardation plate 88 and the reflecting surface 90 could be cemented together to form a single element. Alternatively, other methods could be used to combine these into a single element, such as coating a reflecting surface on the back side of the retardation plate 88 or laminating a quarter-wavelength film on the front surface of the reflecting surface 90.

Figure 13:
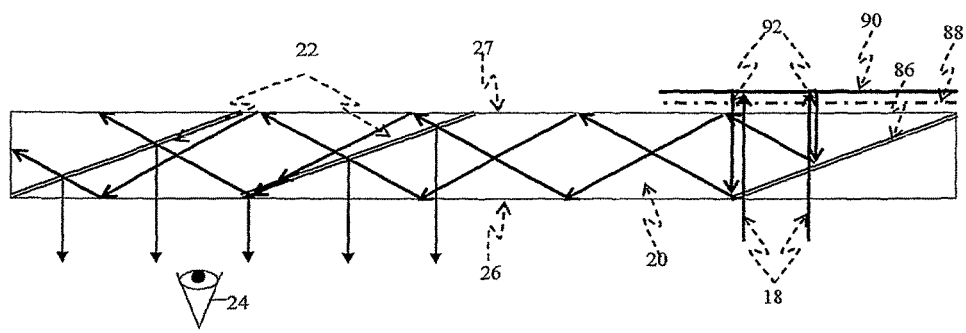
FIG. 13 is a side view of an exemplary light-guide optical element in accordance with the present invention.

FIG. 13 illustrates the entire structure of the LOE with the coupling-in mechanism described in FIG. 2. This LOE fulfils the two seemingly contradicting requirements: The input waves and the image waves are located on the same side of the substrate and the coupling-in reflecting surface is oriented parallel to the partially reflecting coupling-out elements 22. Hence, this structure could be implemented in eyeglasses configurations and still be fabricated using the comparatively simple procedure illustrated above with reference to FIGS. 7A to 7D.

There are some issues that must be considered when using the coupling-in method described herein. One issue is the actual realization of the required polarizer beamsplitter 86. One method to realize this is by exploiting polarization sensitivity of thin film coatings. The main drawback of this method is that, as explained above in reference to FIG. 3, the angle $\alpha_{sur2}$ between the reflecting surfaces and the incoming waves 18 is in the order of 25°. For these angles, the discrimination between the S- and the P-polarizations cannot be prominent enough and suitable separation of the two polarizations is not possible. An alternative solution is presently described, exploiting anisotropic reflecting surfaces, that is, optical surfaces having a major axis parallel to the surface plane wherein the reflection and transmission properties of the surface depend strongly in the orientation of the polarization of the incident light in relation to the major axis of the surface.

A possible candidate for the required anisotropic partially reflecting element can be a wire grid polarizer, generally in the form of an array of thin parallel conductors supported by a transparent substrate. The key factor that determines the performance of a wire grid polarizer is the relationship between the center-to-center spacing or period of the parallel grid elements, and the wavelength of the incident radiation. When the grid spacing or period is much shorter than the wavelength, the grid functions as a polarizer that reflects electromagnetic radiation polarized parallel to the grid elements, and transmits radiation of the orthogonal polarization. In this case, the major axis of a wire grid polarizer is defined as parallel to the array of conductors. Usually, in order to obtain the best transmission and contrast, the wire grid polarizer beamsplitter should be used to transmit the p-polarization and reflect the s-polarization, as illustrated in FIG. 12. It is possible, however, to use the beamsplitter 86 also in the orthogonal orientation, e.g., the major axis of the polarizer is oriented parallel to the propagation direction of the incident beam. Since the major axis of the polarizer is now parallel to the electric field of the p-polarized light, the polarizer reflects the component of the p-polarized light with its electrical field vector parallel to the major axis and transmits the component of the s-polarized light with its electrical field vector perpendicular to the major axis. Usually, the later geometry has reduced efficiency and contrast compared to the one described in FIG. 1, however, for some applications, this geometry can also be useful.

Figure 14:
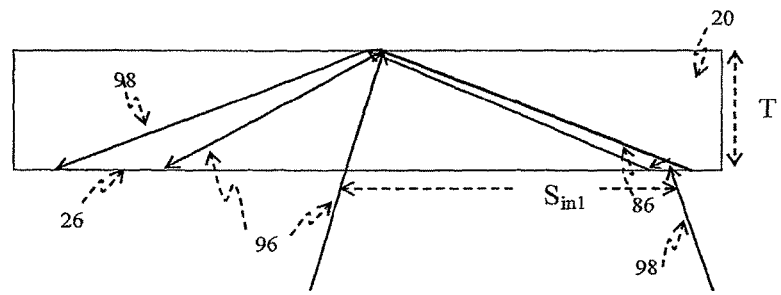
FIG. 14 illustrates two marginal rays coupled into a light-guide optical element by a coupling-in conventional reflecting surface.

Another issue that should be considered is the required entrance aperture of the LOE. FIG. 14 illustrates the aperture of a conventional LOE wherein the coupling-in element is a simple reflecting mirror 16 as described above with reference to FIG. 2. As illustrated, the input aperture is determined by the marginal rays of the two extreme angles of the system's FOV. The rays 96 and 98 are the left and the right marginal rays of the left and the right angles of the FOV respectively. Their intersections with the lower surface 26 of the LOE 20 determine the input aperture $S_{in1}$ of the LOE.

Figure 15:
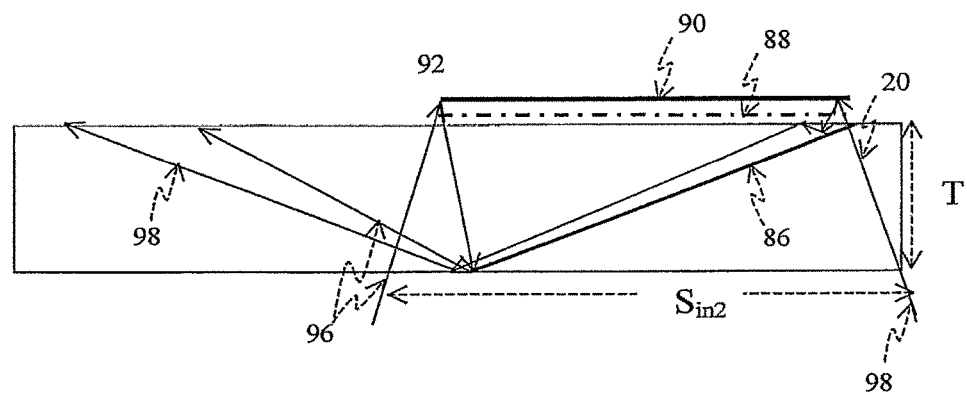
FIG. 15 illustrates two marginal rays coupled into a light-guide optical element by a coupling-in polarization-sensitive reflecting surface, in accordance with the present invention.

FIG. 15 illustrates the required input aperture for an LOE wherein the coupling-in element is a polarizing beamsplitter 86 as described above in reference to FIG. 12. Since the two marginal rays 96 and 98 have to cross an additional thickness T of the LOE before reflecting back by the surface 90 (FIG. 15), the optical path required before impinging on the coupling-in element is longer than before. Hence, the required input aperture $S_{in2}$ is larger than the aperture $S_{in1}$ of FIG. 14. The difference between $S_{in1}$ and $S_{in2}$ depends on the various parameters of the optical system. For example, in a system having a horizontal FOV of 24 degrees, plate thickness of 2.5 mm and refractive index of 1.51, the difference between $SS_{in1}$ and $SS_{in2}$ is 1 mm.

Figure 16:
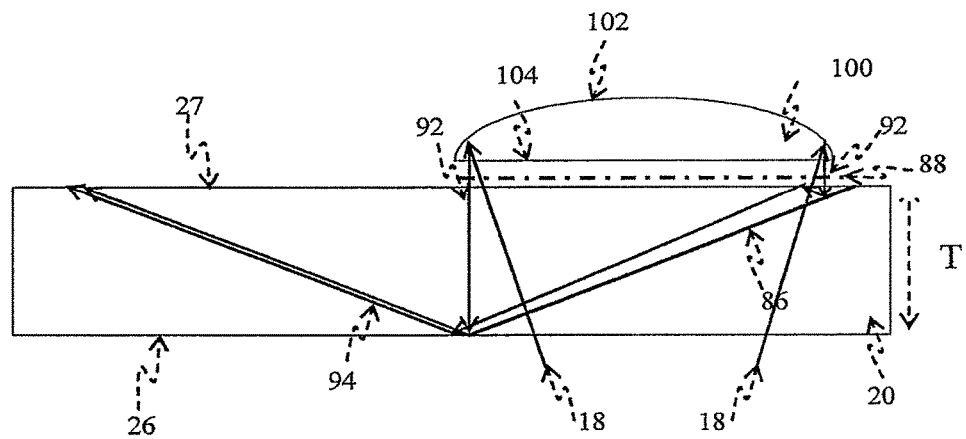
FIG. 16 is a diagram illustrating another embodiment for coupling-in input waves into a light-guide optical element, exploiting a collimating lens, in accordance with the present invention.
Figure 17:
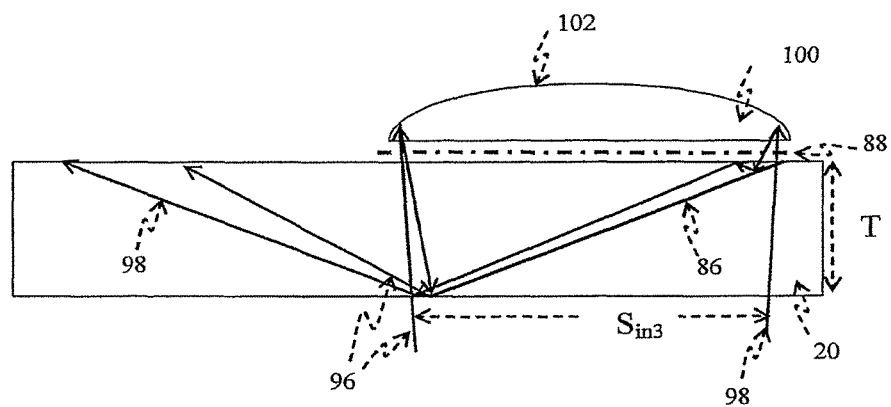
FIG. 17 illustrates two marginal rays coupled into a light-guide optical element by a coupling-in polarization-sensitive reflecting surface utilizing a collimating lens, in accordance with the present invention.

FIG. 16 illustrates a method for significantly decreasing the required input aperture. Instead of utilizing a flat reflecting surface a plano-convex lens 100 placed following the retardation plate 88 can be used. In order to couple collimated waves into the LOE, the waves 18 that enter the LOE through the lower surface 26 should be divergent. These divergent waves are collimated by lens 100 and by the reflection back of the wave from the reflective surface 102 of the lens 100. The waves are then trapped inside the LOE 20 in a similar manner to the method described above with reference to FIG. 12. The retardation plate 88 could be cemented to, or laminated on, the front flat surface 104 of the lens 100. As illustrated in FIG. 17, the input aperture $S_{in3}$ determined by the two marginal rays 96 and 98 is smaller than $SS_{in1}$ (FIG. 14). The extent to which this aperture is smaller than $SS_{in1}$ depends upon the optical power of the collimating lens 100. By utilizing a collimating lens instead of a flat reflecting surface, not only is a much smaller input aperture achieved, but the entire optical module can be much more compact than before as well.

Figure 18:
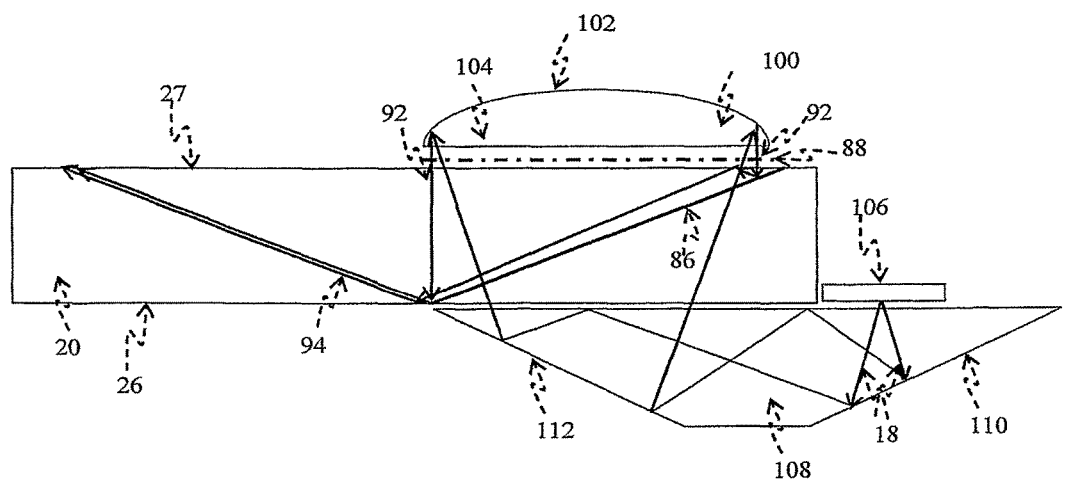
FIG. 18 is a diagram illustrating a device for collimating and coupling-in input waves from a display source into a light-guide optical element, in accordance with the present invention.

FIG. 18 illustrates the entire optical layout of an exemplary system utilizing the method described above. A folding prism 108 is exploited to couple the light from a display source 106 into the LOE 20. The input waves 18 from the display source 106 are coupled into the prism 108 by the first reflecting surface 110 and then coupled out by the second reflecting surface 112, into the LOE 20 where they are collimated and trapped into the LOE in the same manner described above with reference to FIG. 16. The optical system illustrated in FIG. 18 could be much more compact than other conventional collimating modules. A possible drawback of this layout is that the LOE, the collimating lens and the display source are affixed together. There are cases however, where it is preferred to have the LOE 20 separated from the collimating module. For instance, in the optical system of eyeglasses, which is illustrated in FIG. 5, the LOE 20 is integrated into the frame, while the collimating module 50 is attached to the handle. It is therefore preferred that mechanical tolerances between the LOE 20 and the collimating module will be released as far as possible. One method to overcome this problem is to integrate the display source 106, the folding prism 108, the retardation plate 88 and the collimating lens 100 into a single mechanical body, leaving a space for the LOE 20 to be inserted.

Figures 19, 20:
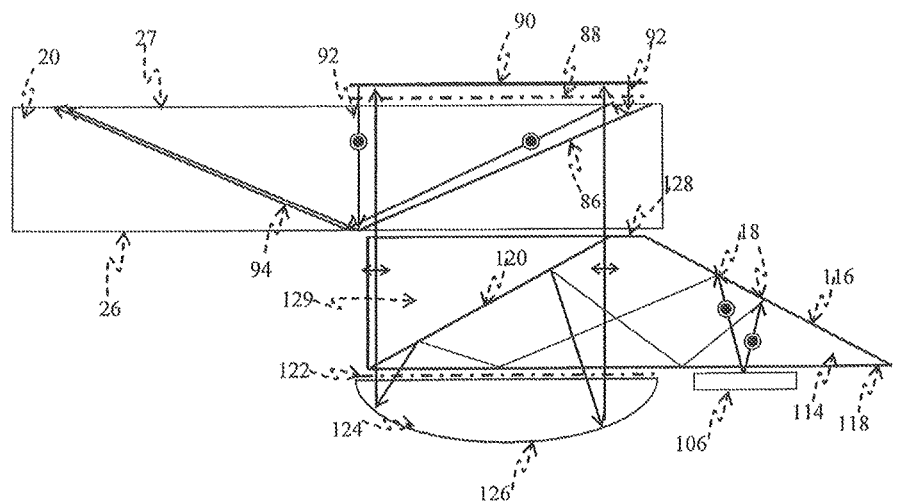
FIG. 19 is a diagram illustrating another embodiment for collimating and coupling-in input waves from a display source into a light-guide optical element, in accordance with the present invention.
FIG. 20 is a diagram illustrating yet another embodiment for collimating and coupling-in input waves from a display source into a light-guide optical element, in accordance with the present invention.

A modified method is illustrated in FIG. 19, wherein the collimating lens is attached to the folding prism instead of the LOE 20. As illustrated, the s-polarized input waves 18 from the display source 106 are coupled into the prism 114 by the first reflecting surface 116. Following internal reflection from the lower surface 118 of the prism, the waves are reflected and coupled out off a polarizing beamsplitter 120. The waves then pass through the quarter-wavelength retardation plate 122, are collimated by the lens 124 and the reflecting surface 126, returned to pass again through the retardation plate 88 and enter the prism 114 through the lower surface 118. The now p-polarized light waves, pass through the polarizing beamsplitter 120 and the upper surface 128 of the prism and enter the LOE 20 through its lower surface 26. The incoming waves are now trapped inside the LOE 20 in the same manner illustrated in FIG. 12. The collimating module 129 comprising the display source 106, the folding prism 114, the retardation plate 88 and the collimating lens 124 can be easily integrated into a single mechanical module which can be assembled independently of the LOE, with fairly relaxed mechanical tolerances.

In the embodiment illustrated in FIGS. 17 to 19 only a single spherical converging lens is utilized. For some optical schemes that may be sufficient, however, for other systems having wide FOV and large input apertures, better optical qualities may be required. One approach to improve the optical properties of the system is to exploit either aspheric or even aspheric-diffractive lenses. Another approach is to utilize more than one imaging lens.

FIG. 20 illustrates an optical system utilizing a larger prism 130 containing two embedded polarizing beamsplitters 132 and 134, a quarter-wavelength retardation plate 136 and two converging lenses 138 and 140. As illustrated, the p-polarized input wave 18 passing through the first polarizing beamsplitter 132, is then reflected, partially converged and changed to s-polarized light by the retardation plate 136 and the first lens 138. The wave is then reflected by the first polarizing beamsplitter 132, the lower surface 142 of the prism 130 and then by the second polarizing beamsplitter 134. It is then reflected, fully collimated and changed back to p-polarized light by the retardation plate 136 and the second lens 140. The wave then passes through the second polarizing beamsplitter 134 and enters into the LOE 20 through the lower surface 26. The incoming wave is now trapped in the LOE 20 in the same manner as illustrated in FIG. 12. The collimating modules illustrated in FIGS. 19 and 20 can be utilized not only for LOEs utilizing polarizing beamsplitters 86 as coupling-in elements, but also for conventional LOEs, wherein a simple reflecting minor 16 is utilized as the couple-in element. Moreover, these collimating modules could also be exploited in other optical systems wherein the display source is linearly polarized (or alternatively, when brightness efficiency is not a critical issue) and when a compact collimating module is required. A collimating optical module, similar to those illustrated in FIGS. 19 and 20 having any required number of polarizing beamsplitters and imaging lenses could be utilized according to the required optical performance and overall size of the optical system.

Figure 21:
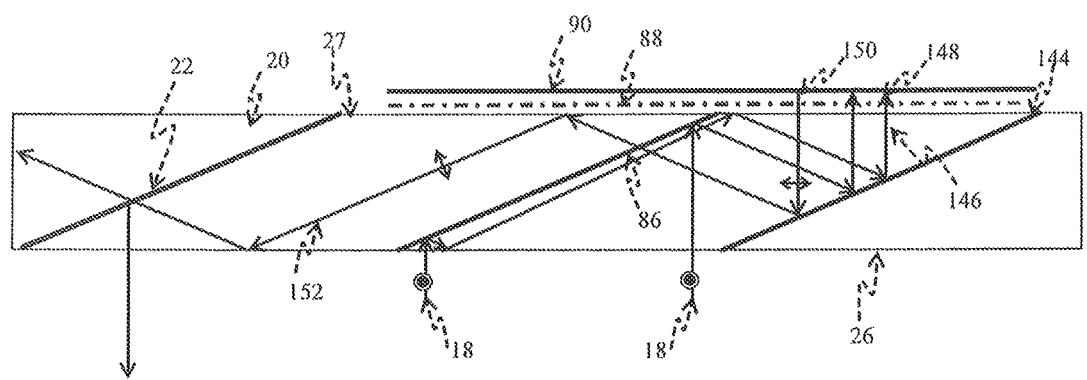
FIG. 21 is a diagram illustrating still a further embodiment for coupling-in unpolarized input waves into a light-guide optical element, in accordance with the present invention.

There are optical systems wherein the display source is unpolarized and where maximal possible efficiency is important. FIG. 21 illustrates an embodiment wherein another simple reflecting surface 144 is embedded inside the LOE, parallel to the couple-in element 86. As illustrated, the s-polarized component of the incoming beam 18 is coupled into the LOE 146 by the surface 86, reflected by the surface 144, and is then reflected and changed top-polarized light by the retardation plate 88 and the reflecting surface 90. The reflected wave 150 is then coupled into the LOE 20 by the reflecting surface 144. The p-polarized coupled light 152 passes through the surface 86 and merges with the original p-polarized component, which is trapped inside the LOE 20 in the same manner illustrated in FIG. 20.

For each instance where we have followed a particular polarized wave path in the examples described above, the polarizations are interchangeable. That is, on altering the orientation of the polarizing beamsplitters, each mention of p-polarized light could be replaced by s-polarized light, and vice-versa.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An optical system, comprising:
   a light-transmitting substrate having at least two major external surfaces parallel to each other, edges and at least one partially reflecting surface located in the substrate; and
   an optical device for coupling light waves into the substrate to effect total internal reflection of the coupled-in light waves between the two major external surfaces of the substrate, the optical device including a polarization sensitive beamsplitter and a first reflecting surface, the beamsplitter and the first reflecting surface oriented so that a first part and a second part of the coupled-in light waves are reflected from the beamsplitter and the first reflecting surface, respectively, at oblique angles with respect to the external surfaces, causing the reflected waves to be trapped inside the substrate by internal reflection; the light waves reflected at least once by one of the external major surfaces of the substrate before being coupled-out of the substrate by the partially reflecting surface.

2. The optical system according to claim 1, further comprising a second reflecting surface and a first retardation plate.

3. The optical system according to claim 2, wherein the first part of the light waves passes at least once through the beamsplitter, is reflected at least once from the beamsplitter, is reflected at least once from the second reflecting surface and passes at least once through the first retardation plate prior to being coupled into the substrate.

4. The optical system according to claim 2, wherein the second part of the light waves is reflected at least once from the beamsplitter, is reflected at least once from the second reflecting surface, is reflected at least twice from the first reflecting surface, passes at least once through the beamsplitter and passes at least once through the first retardation plate prior to being coupled into the substrate.

5. The optical system according to claim 2, wherein the first retardation plate is a first quarter-wave retardation member having a back side located next to one of the major surfaces.

6. The optical system according to claim 5, wherein the second reflecting surface is located next to the first quarter-wave retardation member.

7. The optical system according to claim 5, wherein the second reflecting surface is cemented to the first quarter-wave retardation member.

8. The optical system according to claim 5, wherein the second reflecting surface is coated on the back side of the first quarter-wave retardation member.

9. The optical system according to claim 5, wherein the first quarter-wave retardation member is a film laminated on the front surface of the second reflecting surface.

10. The optical system according to claim 5, further comprising a converging lens having a front surface and a back surface, the lens being located next to the first quarter-wave retardation member.

11. The optical system according to claim 10, wherein the back surface of the converging lens is coated with a reflecting coating.

12. The optical system according to claim 10, wherein the converging lens is a piano-convex lens.

13. The optical system according to claim 1, further comprising an array of at least two partially reflecting surfaces located in the substrate which surfaces are non-parallel to said major surfaces of the substrate.

14. The optical system according to claim 13, wherein the beamsplitter is parallel to the array of partially reflecting surfaces.

15. The optical system according to claim 1, wherein the beamsplitter is embedded inside the light-transmitting substrate.

16. The optical system according to claim 15, wherein the first reflecting surface is embedded inside the light-transmitting substrate.

17. The optical system according to claim 16, wherein the first reflecting surface is parallel to the beamsplitter.

18. The optical system according to claim 1, wherein the beamsplitter is non-parallel to the major surfaces of the substrate.

19. The optical system according to claim 1, wherein the beamsplitter reflects s-polarized light and transmits p-polarized light.

20. The optical system according to claim 1, wherein the beamsplitter reflects p-polarized light and transmits s-polarized light.

21. The optical system according to claim 1, wherein the beamsplitter comprises a polarization sensitive thin film dielectric coating.

22. The optical system according to claim 1, wherein the beamsplitter comprises a wire grid polarizer.

23. The optical system according to claim 1, further comprising at least one display light source for producing input light waves.

24. The optical system according to claim 23, wherein light waves emerging from the display source enter the light-transmitting substrate through one of the major surfaces.

25. The optical system according to claim 23, wherein the input light waves are linearly polarized.

26. The optical system according to claim 23, wherein the input light waves are unpolarized.

27. The optical system according to claim 23, further comprising an optical module which collimates the input light waves.

28. The optical system according to claim 27, wherein the collimating optical module comprises a folding prism.

29. The optical system according to claim 28, further comprising at least one polarizer beamsplitter embedded inside the folding prism.

30. The optical system according to claim 29, further comprising a second quarter-wave retardation member located next to the folding prism.

31. The optical system according to claim 30, further comprising at least one converging lens having a back surface located next to the second quarter-wave retardation member.

32. The optical system according to claim 31, wherein the back surface of the at least one converging lens is coated with a reflective coating.

33. The optical system according to claim 1, wherein the first part of the light waves is p-polarized and the second part of the light waves is s-polarized.

34. The optical system according to claim 1, wherein the first part of the light waves is s-polarized and the second part of the light waves is p-polarized.

35. An optical system, comprising:
a light-transmitting substrate having at least two major external surfaces parallel to each other, edges and at least one partially reflecting surface located in the substrate;
an optical device for coupling light waves into the substrate to effect total internal reflection of the coupled-in light waves between the two major external surfaces of the substrate;
the optical device including a polarization sensitive beamsplitter, a first reflecting surface, a second reflecting surface and a retardation plate; the beamsplitter oriented so that a first part of the coupled-in light waves is reflected from the beamsplitter at an oblique angle with respect to the external surfaces, causing the reflected waves to be trapped inside the substrate by total internal reflection;
the second reflecting surface is oriented so that a second part of the coupled-in light waves is reflected from the first reflecting surface at oblique angles with respect to the external surfaces, causing the reflected waves to be trapped inside the substrate by total internal reflection, and
the light waves reflected at least once by one of the external major surfaces of the substrate before being coupled-out of the substrate by the partially reflecting surface.

36. The optical system according to claim 35, wherein the first part of the light waves passes at least once through the beamsplitter, is reflected at least once from the beamsplitter, is reflected at least once from the second reflecting surface and passes at least once through the retardation plate, prior to being coupled into the substrate.

37. The optical system according to claim 35, wherein the second part of the light waves is reflected at least once from the beamsplitter, is reflected at least once from the second reflecting surface, is reflected at least twice from the first reflecting surface, passes at least once through the beamsplitter and passes at least once through the retardation plate prior to being coupled into the substrate.

38. An optical system, comprising:

a light-transmitting substrate having at least two major external surfaces parallel to each other, edges and at least one partially reflecting surface located in the substrate;

an optical device for coupling light waves into the substrate to effect total internal reflection of the coupled-in light waves between the two major external surfaces of the substrate, the optical device including a polarization sensitive beamsplitter, a first reflecting surface, a second reflecting surface and a retardation plate;

a first part of the light waves passes at least once through the beamsplitter, is reflected at least once from the beamsplitter, is reflected at least once from the second reflecting surface and passes at least once through the retardation plate, prior to being coupled into the substrate;

a second part of the light waves is reflected at least once from the beamsplitter, is reflected at least once from the second reflecting surface, is reflected at least twice from the first reflecting surface, passes at least once through the beamsplitter and passes at least once through the retardation plate, prior to being coupled into the substrate, and the beamsplitter and the second reflecting surface is oriented so that the coupled-in light waves are reflected from the beamsplitter and at the second time from the second reflecting surface at oblique angles with respect to the external surfaces, causing the reflected waves to be trapped inside the substrate by total internal reflection, the light waves to be reflected at least once by one of the external major surfaces of the substrate, before being coupled-out of the substrate by the partially reflecting surface.

* * * * *